A. G. F. KUROWSKI & O. A. MARTINI.
TIME CONTROLLED CAMERA SHUTTER OPERATOR.
APPLICATION FILED OCT. 27, 1915.
1,190,301.
Patented July 11, 1916.
2 SHEETS—SHEET 1.
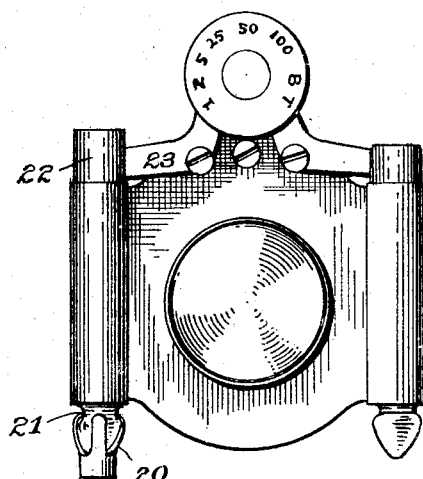
Fig. 1.
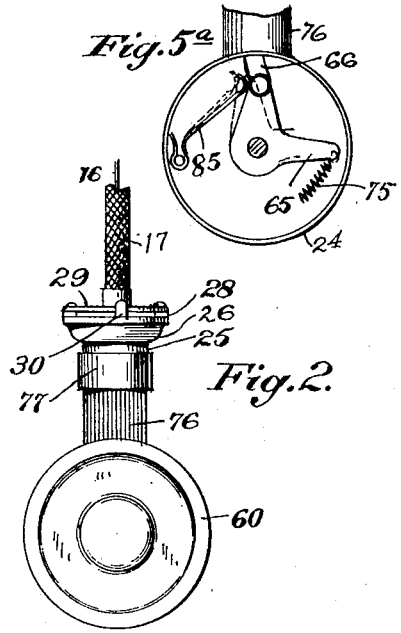
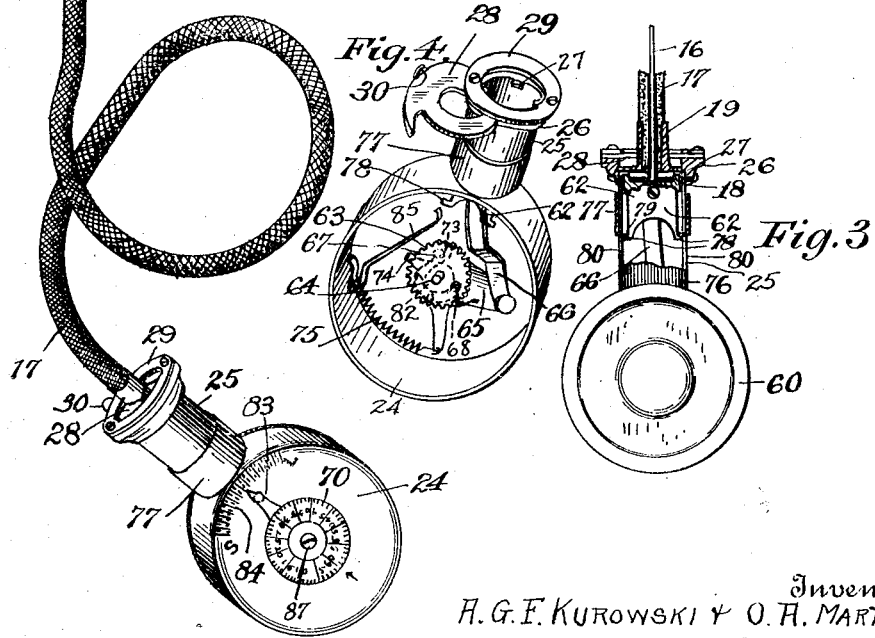
Inventors:
A. G. F. Kurowski & O. A. Martini,
By their Attorney

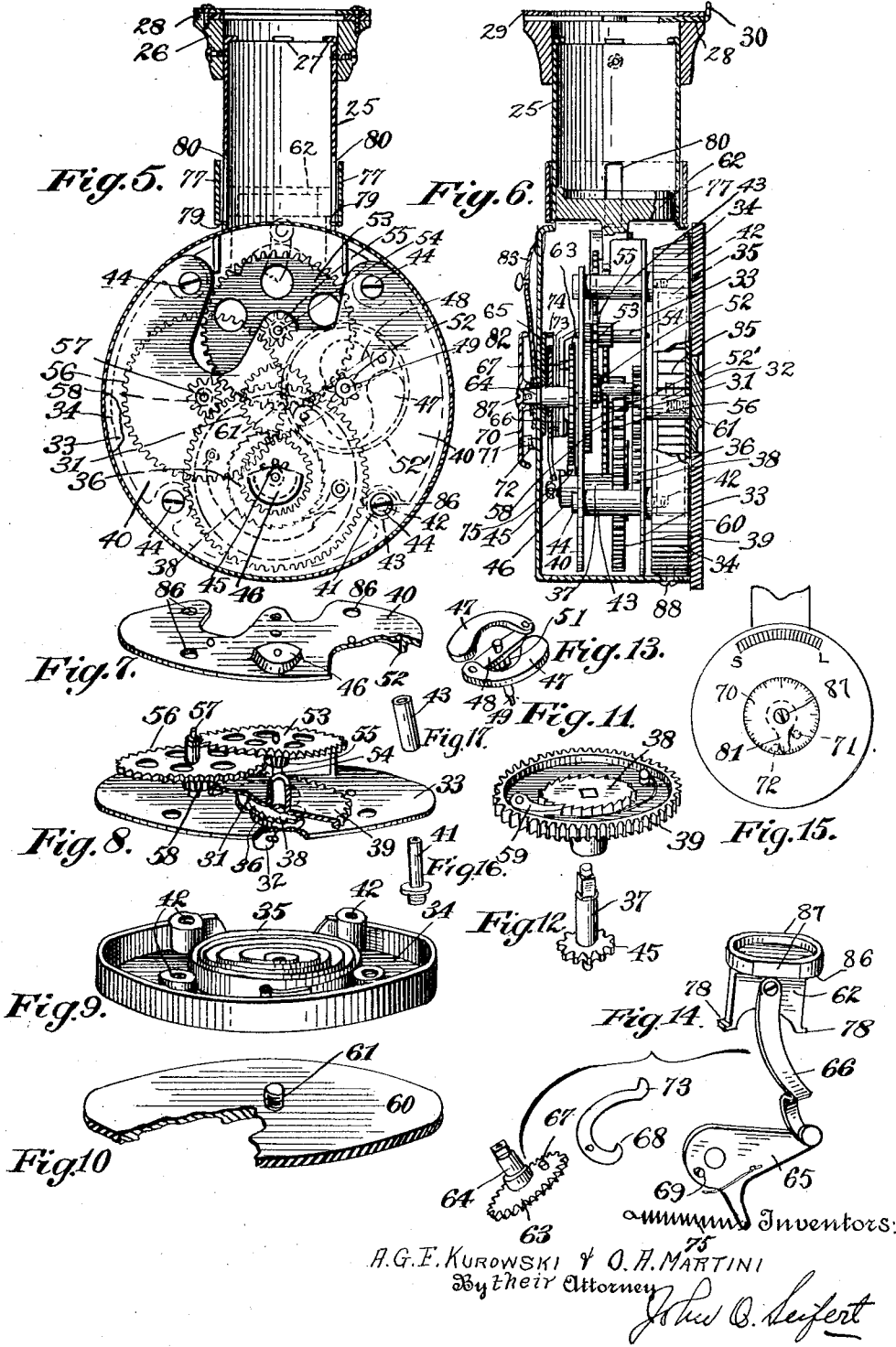

UNITED STATES PATENT OFFICE.

ALFRED G. F. KUROWSKI AND OTTO A. MARTINI, OF NEW YORK, N. Y., ASSIGNORS TO FELIX GOODFRIEND, OF NEW YORK, N. Y.

TIME-CONTROLLED CAMERA-SHUTTER OPERATOR.

1,190,301.　　　　　Specification of Letters Patent.　　Patented July 11, 1916.

Application filed October 27, 1915.　Serial No. 58,120.

*To all whom it may concern:*

Be it known that we, ALFRED G. F. KUROWSKI, a subject of the Emperor of Germany, and OTTO A. MARTINI, a subject of the King of Denmark, both residing in the borough of Brooklyn, in the county of Kings, city and State of New York, have invented a new and useful Time-Controlled Camera-Shutter Operator, of which the following is a specification.

This invention relates to time controlled or chronometric camera shutter operating devices, and it is the primary object of the invention to improve the general construction of devices of this character and thereby increase the efficiency thereof.

Devices of this character as heretofore constructed have only been adapted for use in taking what are commonly termed "snap shots", and it is a further object of the invention to provide a device for not only taking snap shots, but also for taking time exposures in which the camera shutter is operated to open the shutter and released to close the same.

It is another object of the invention to provide in a device of this character a signal which is normally covered and concealed and is automatically uncovered and exposed to view just previous to the actuation of the camera shutter, and is again concealed just after the shutter closes.

Other objects and advantages will hereinafter appear.

Our improved shutter operating device is constructed to be particularly adapted to what is known as the "Antinous release" in which a flexible and axially movable member or wire is adapated to operate the shutter actuating mechanism of a camera by imparting axial movement thereto, said member being carried by a tubular casing whereby it is connected to the shutter actuating means of the camera. In carrying out our invention we provide a spring actuated train of gearing or clockwork inclosed in a casing having a tubular projecting portion constituted to be connected to the carrier for the axially movable member to be carried thereby. Slidably mounted in said projecting portion of the casing is a reciprocatory plunger adapted to be coupled and uncoupled to the gearing at a predetermined time when the gearing is actuated by the spring, means being provided to wind the spring independent of the gearing and to set or adjust means for regulating the time at which the plunger is coupled or uncoupled with the gearing, suitable indicating means being provided to indicate such adjustment.

In the drawings accompanying and forming a part of this specification, Figure 1 is a front elevation of that portion of a camera carrying the shutter and its actuating mechanism with an embodiment of our invention applied thereto, the latter being shown in perspective and looking at the front thereof. Fig. 2 is a view looking at the rear of the casing. Fig. 3 is a view similar to Fig. 2 with part thereof broken away to illustrate the manner of connecting our improved shutter operator to the axially movable member. Fig. 4 is a perspective view of the casing looking at the interior thereof with the train of gearing removed and showing the means to couple and uncouple the plunger with the gearing. Fig. 5 is a sectional rear elevation to illustrate the train of gearing and the mounting of the plunger. Fig. 5ᵃ is a front elevational view with the gearing removed showing the means to connect the plunger to the gearing and showing the position it assumes just previous to being disconnected from the gearing. Fig. 6 is a sectional side elevation of the operating device. Figs. 7, 8, 9 and 10 are perspective views looking at the top of component parts of the operating device. Fig. 11 is a perspective view looking at the bottom with ratchet mechanism to permit winding of the spring independent of the gearing and to connect the gearing to the spring after the spring has been wound to actuate the gearing. Fig. 12 is a perspective view of the shaft for the gear shown in Fig. 11 with the pinion to connect the shaft to the spring. Fig. 13 is a perspective view of a governor to control the movement of the clockwork. Fig. 14 is a perspective view of the plunger and the component parts to couple the plunger to the gearing disassembled. Fig. 15 is a view looking at the front of the casing and showing a modification of the setting or regulating means; and Figs. 16 and 17 are perspective details of the casing.

Similar characters of reference designate like parts throughout the different views of the drawings.

As stated our invention is particularly adapted for use in connection with a camera shutter actuator known as the "Antinous release," consisting of a flexible wire or rod 16 slidably mounted in a tubular and flexible casing 17, said wire projecting from both ends of the carrier 17, the one end having a head 18 fixed thereto and the adjacent end of the carrier having a similar head 19, a spring (not shown) in the casing being tensioned to normally force the head 18 in an outward direction to a limited extent. The opposite end of the casing 17 has a resilient claw 20 to releasably secure it to a barrel 21 forming a part of the shutter mechanism of the camera, as shown. Slidably mounted in said barrel is a piston 22 pivotally connected to one arm of a pivoted bell crank lever 23, the other arm of which lever is connected to the shutter actuating mechanism of the camera. The end of the wire 16 opposite to the head 18 extends into an opening in the barrel to engage with the piston 22. By pressing on the head 18 axial inward movement will be imparted to the wire 16 which wire engages with the piston 22 moving it upward and rocking the lever and thereby actuating the shutter operating mechanism of the camera.

It is the object of our invention to provide time controlled means to mechanically impart axial movement to the wire 16 at a predetermined time, such means being carried in a circular casing 24 having a tubular projecting portion 25 opening into the casing and open at the outer end. Connected to the outer end of the tubular portion is a head 26. The wire head 18 is adapted to engage in the tubular portion 25, while its carrier head 19 engages in the head 26 inward movement thereof being limited by stops 27, which may consist of portions of the member 25 bent inward. To releasably secure the casing to the carrier 17 so that it will be carried thereby the head 26 is provided with a pivoted latch 28. When the head 19 is to be inserted into the tube opening the latch is swung out to the full line position shown in Fig. 4, and after the head has been inserted the latch is swung into a slot in the end of the tube head formed by a collar 29 secured to the end thereof, the latch having a lip 30 to facilitate the manipulation thereof. To actuate said axially movable member 16 there is provided a spring actuated train of gearing or clockwork, consisting of a main drive gear 31 fixed to a shaft 32 journaled in a plate 33 and the bottom of a dished member 34, the plate 33 and member 34 constituting a closed housing for a spring 35, the inner end of which is secured to the shaft 32 and the outer end anchored to a fixed part of the casing. The gear 31 is located on the side of the plate 33 opposite to the spring 35 and meshes with a pinion 36 mounted on the squared end of a shaft 37 to rotate therewith. Also mounted on the squared end of a shaft 37 juxtaposed to the pinion 36 is a ratchet wheel 38. Loosely mounted on the shaft 37 in superposed relation to the ratchet wheel is a gear 39 for a purpose to be hereinafter described.

The shaft 37 is journaled in the plate 33 and a plate 40. The said plates are mounted on shouldered studs 41 secured in bosses 42 in the member 34. The plate 33 abuts against the shoulder on said studs and the plate 40 is spaced from the plate 33 by spacers or sleeves 43, and the latter plate held in place by headed screws 44 engaging in the end of the studs. The shaft 37 has a pinion 45 fixed thereto to engage in a recessed portion 46 in the plate, as clearly shown in Figs. 5, 6, and 7.

The movement of the gearing is regulated by a governor comprising a pair of weights 47 pivotally connected to opposite ends of an arm 48 fixed to the end of a shaft 49 journaled in the plates 33 and 40. The governor weights engage with an annular flanged portion 52 of the plate 40 and frictionally coöperate with said flange to retard the rotation of the gearing. A pinion 51 fixed to the governor shaft 49 meshes with a gear 53 fixed to a shaft 54. A pinion 55 fixed to said latter shaft meshes with a gear 56 fixed to a shaft 57, and a pinion on said latter shaft meshes with the gear 39. The train of gearing is connected to the spring through a spring influenced pawl 59 carried by the gear 39 coöperating with the ratchet wheel 38. When the spring 35 is wound by suitable means, in the present instance by a disk 60 to serve as a winding key, the perimeter of said disk being knurled and having a central threaded stem 61 engaging in a threaded opening in the end of shaft 32, the pawl will ride over the teeth of the ratchet wheel, but when the shaft 32 with its connected gear 31 is rotated by the spring in reverse direction the pawl will engage with a tooth of the ratchet wheel and the governor actuated thereby through the gearing just described.

Axial movement is imparted to the wire 16 by a reciprocable plunger or piston 62 slidably mounted in the tubular portion 25 of the casing. Said plunger is connected to and outward movement imparted thereto by a gear 63 meshing with the pinion 45, said gear 63 being fixed to a stud shaft 64 and whereby it is rotatably mounted in the casing 24. Rotatably mounted on the shaft 64 is a lever 65 connected to the plunger by a link 66, opposite ends of the link being offset, as shown (Fig. 14) to permit of movement thereof in the tubular portion 25. The gear 63 is connected to the lever 65 and movement imparted to the latter by a pin 67 projecting from one face of the gear coöperating with one end 68 of a spring influenced latch pivotally mounted on a pin 69 fixed in the lever. Fixed to the shaft 64 outside of the casing is a dial 70 having graduations numbered from "5" to "60" and representing sixty seconds and normally maintained in position so that the numeral "60" will register with an arrow on the casing by a stop 71 carried thereby abutting against a stop 72 fixed in the casing.

In operation, assuming that it is desired that the camera shutter is to be operated at the expiration of 45 seconds, the spring is wound by the key 60 and simultaneously therewith the gear 63 is rotated and with it the dial 70 until the character 45 registers with the arrow on the casing when the key is released and the mechanism is automatically set in operation, the movements thereof being regulated by the governor. At the expiration of approximately thirty seconds, or when the character "15" registers with the arrow the gear pin 67 will engage with the end 68 of the latch and carry said latch with it and thereby rotate the lever 65 causing the link to move the plunger outward the plunger engaging with the head 18 of the wire and pushing the connected wire 16 into its carrier forcing the piston 22 upward and swinging the lever 23 on its pivot, and through the latter operating the shutter actuating mechanism of the camera. During the movement of the plunger the opposite end 73 of the latch will engage with a stop 74, swinging said latch on its pivot against the action of its spring and throwing the end 68 of the latch out of engagement with the gear pin 67, when the arm and plunger through the link 66 will be returned to initial position by spring 75 after which the dial stop 71 will engage with the stop 72.

To indicate just previous to the operation of the shutter that the latter will be actuated there is provided a signal, this signal being normally covered and concealed and adapted to be uncovered and exposed to view just previous to the operation of the camera shutter, and again concealed after the shutter has been actuated. This signal consists of providing a portion of the tubular portion 25 with a colored enamel, preferably red, as shown at 76 (Figs. 2 and 3). This red enameled portion is normally covered and concealed by a sleeve 77 slidable on the tubular portion 25, as shown in Figs. 1, 5 and 6, and is lifted to uncover the signal just previous to the termination of the upward movement of the plunger. To lift this sleeve the plunger has lateral projecting nibs 78 adapted to engage below nibs 79 projecting inward from the sleeve and through slots 80 in the tubular portion 25. It will be obvious that when the plunger is returned to initial position the sleeve will drop and cover the signal.

To permit of setting or adjusting of the mechanism so that the shutter will operate at any time, in the present within two minutes, there is provided an intermediate stop between the stops 71 and 72, this stop consisting of a link 81 (Fig. 15) rotatably supported on the shaft 64 between the casing and the dial 70. When the dial is adjusted to more than one minute or one revolution the pin 71 will engage with the link on the side opposite to that with which the pin is shown engaging in Fig. 15 and carry the link with it, and should it be desired to set the device to operate at an interval of two minutes the disk will be rotated until the stop 81 engages with the opposite side of the pin 72 to that with which it is shown engaging in Fig. 15. It will be obvious that in operation the second revolution of the dial pin 71 will carry the link with it. To prevent the lever 65 and connected link from assuming a dead center position and assure the return of the lever and connected plunger there is provided a spring 85 (Fig. 4) arranged to engage at the pivotal connection of the link and lever just previous to said link and lever assuming a dead center position with relation to the plunger and the axis of the lever, the further movement of the lever tensioning said spring and the spring tending to break the joint between the link and lever.

To adapt the device to what are termed "time exposures", that is, in which the shutter is actuated to open the same and is again actuated to close it, the stop 74 is made adjustable, and for this purpose it is carried by a disk 82 rotatably mounted on the shaft 64 between the lever 65 and casing. This stop is adjusted by a lever 83 outside of the casing connected to the disk, the said lever being in the nature of a pointer to indicate on graduations 84 on the casing the extent of such adjustment and the time of the exposure. It is to be understood that in this connection the shutter actuating mechanism of the camera is set for "bulb exposures" in the usual manner. The graduations 84 have the designations "S" to represent a short exposure and "L" to represent the longest exposure and the direction in which to move the pointer, and in the present instance is constructed to operate the shutter to close it at any time from one to fifteen seconds after the shutter has been opened, the space between the full lines representing seconds and the space between a full line and a broken line one-half seconds. Should the stop be adjusted so that the pointer will indicate one second the shutter will be closed one second after it has been opened, and should the pointer be adjusted to the extreme right the shutter will not close until the expiration of fifteen seconds after it has been opened. It will be understood that this means may be devised to operate to close the shutter at an interval greater than fifteen seconds. In the operation of the device for "time exposures" the plunger is moved upward and axial movement imparted to the wire 16 as and for the purpose hereinbefore set forth, but instead of the latch being tripped and the plunger disconnected from the train of gearing and returned to initial position at once and permit the return movement of the wire 16 the latch is not tripped until a predetermined time after the opening of the shutter, such return movement being regulated by the adjustment of the stop 74.

In assembling the device the spring 35 is first placed in the dished member 34 and the posts 41 secured in the bosses 42, when the plate 33 is placed on the posts. The shaft 32 of the pinion 31 is then passed through the plate 33 and the winding key 60 secured thereto and by rotating said key in clockwise direction a pin on the shaft 32 will engage in an opening in the inner end of the spring connecting said spring to the pinion 31. The gears 39, 53, 56 and governor are then assembled on the plate 40 by placing one end of the shafts for said gears in their bearings in said plate. The sleeves 43 are then placed on the posts 41 and the posts passed through the openings 86 in the plate 40 when the opposite ends of the shafts for the gears 39, 53, 56 and governor may be readily placed in their bearings in the plate 33. The plate is then secured by the screws 44. It will thus be seen that the train of gearing with the spring constitutes a unitary structure which may be readily placed in and removed from the casing 24. The plunger 62 with the connected link and lever is then placed in the tubular portion 25 and the shaft 64 of the gear 63 passed through the opening in the lever 65, the stop carrier 82, casing and intermediate stop 81, when the dial is connected thereto outside of the casing and the whole secured in assembled position by a screw 87 engaging in the end of shaft 64, said screw also holding the dial to the shaft. When the spring and gear-train unit is placed in the casing the pinion 45 will mesh with the gear 63 operatively connecting the gearing thereto, the gear and spring unit being maintained in the casing by screws 88 passing through the casing and having screw threaded connection with the spring housing.

The lever 65 and link 66 is in the nature of a toggle joint, and it will be obvious that there will be a quick movement imparted to the plunger during the initial outward movement thereof, and that when the plunger engages with the head 18 and the load is applied to the plunger 62 there is a slow movement imparted to the plunger, thereby greatly facilitating the operation thereof. The outward movement of the plunger is limited by the engagement of the signal nibs 79, with which the plunger nibs coöperate, engaging with the top of the slot in the tubular portion 25, while the inward movement is limited by the flanged portion 86 of the plunger engaging with the casing 24 adjacent to the connection of the tubular portion therewith. The plunger has opposite flattened portions 87 to permit of the insertion of the plunger into the tubular portion 25, and after it has been inserted it is given a quarter turn to assume its normal position, when the flanged portion 86 will serve to coöperate with the casing to limit the inward or outward movement of the plunger.

It will be noted that when utilizing the device for time exposures and when the shutter is maintained in open position the connection between lever 65 and link 66 will pass over the dead-center position, imparting a slight inward movement to the plunger, but this movement will not be so great as to permit of movement of wire 16 sufficiently to release the shutter. During this movement of the lever and link the spring 85 will engage therewith and as soon as the plunger is uncoupled from the gearing the spring will return the lever and link over the dead center position. To lock the stop 74 in adjusted position the graduations 84 are in the form of recesses with which the point of the lever 83 coöperates as a detent.

While we have shown and described our invention in connection with a particular form of shutter actuating mechanism of a camera, it is to be understood that our device is applicable to any form of shutter actuating mechanism in connection with which a release of the "Antinous" type may be utilized.

Having thus described our invention, we claim:

1. In a device of the class specified the combination with a clock-work, of a reciprocable plunger; a pivotally supported lever connected to the plunger; means to connect said lever to the clock-work at a predetermined time to rotate the lever and impart movement to the plunger in one direction and to disconnect said lever from the clock-work at a predetermined time, substantially as and for the purpose specified.

2. In a device of the class specified, the combination of a reciprocable plunger; a clock-work; means to wind the latter in one direction and indicate the extent of such movement; means operable at a predetermined time to automatically connect the plunger to the clock-work when moving in a reverse direction to impart movement to the plunger and to disconnect the plunger from the clock-work, substantially as and for the purpose specified.

3. In a device of the class specified, the combination with a clock-work, of a reciprocable plunger; a rotatably supported lever connected to the plunger; means to connect the lever to the clock-work at a predetermined time to impart movement to the plunger in one direction; and means to disconnect the lever from the clock-work at a predetermined time to permit the return of the lever and plunger, substantially as and for the purpose specified.

4. In a device of the class specified, the combination with a clock-work, of a reciprocable plunger; a rotatably supported lever connected to the plunger; a latch to connect the lever to the clock-work at a predetermined time to impart movement to the plunger in one direction; and means to trip said latch at a predetermined time to disconnect the lever from the clock-work and permit the return of the lever and plunger, substantially as and for the purpose specified.

5. In a device of the class specified, the combination with a clock-work, of a reciprocable plunger; a rotatably supported lever; a link to connect the lever to the plunger; means to connect the lever to the clock-work at a predetermined time to impart movement to the plunger; and adjustable means to disconnect the lever from the clock-work at a predetermined time, substantially as and for the purpose specified.

6. In a device of the class specified, the combination with a clock-work, of a reciprocable plunger; a rotatably supported lever connected to the plunger; means to automatically connect the lever to the clock-work at a predetermined time to impart movement to the plunger; adjustable means to automatically disconnect the lever from the clock-work at a predetermined time; and a spring to return the lever and the plunger to initial position when the lever has been disconnected from the clock-work.

7. In a device of the class specified, the combination with a clock-work, of a reciprocable plunger; a rotatably supported lever; a link to connect the lever to the plunger; a latch pivotally carried by the lever coöperating with the clock-work to connect the lever thereto at a predetermined time to rotate the lever and impart movement to the plunger in one direction; and an adjustable trip to engage with and trip the latch at a predetermined time to disconnect the lever from the clock-work and permit return movement of the lever and plunger, substantially as and for the purpose specified.

8. In a device of the class specified, the combination with a clock-work, of a casing therefor having a laterally projecting tubular portion; a reciprocable plunger slidably mounted in said tubular portion; means to wind said clock-work in one direction and to indicate the extent of said movement; means operable by the clock-work at a predetermined time when moving in a reverse direction to impart movement to the plunger outward from the tube and to permit the return movement of said plunger; and a spring to return said plunger.

9. In a device of the class specified the combination with a clock-work, of a casing therefor having a laterally projecting tubular portion; a reciprocable plunger slidably mounted in said tubular portion; means to connect said plunger to the clock-work at a predetermined time and impart movement thereto; a normally covered signal; means to disconnect the plunger from the clock-work at a predetermined time and permit return movement thereof; and means operable with the plunger to cover and uncover the signal during the movement thereof, substantially as and for the purpose specified.

10. In a device of the class specified the combination with a clock-work, of a casing therefor having a laterally projecting tubular portion; a plunger slidably mounted in said tubular portion; means to connect the plunger to the clock-work at a predetermined time and impart movement thereto in one direction; a signal on the tube; a sleeve slidable on the tube normally covering said signal and adapted to be moved by the plunger when movement is imparted to the latter by the clock-work to uncover and expose the signal; and means to disconnect the plunger from the clock-work at a predetermined time and permit return movement thereof and the sleeve, substantially as and for the purpose specified.

11. In a device of the class specified the combination with a train of gearing and a spring to actuate the same, of a casing to inclose said gearing and spring having a laterally projecting tubular portion; a plunger slidably mounted in said tubular portion; a pinion rotatable in one direction by the spring through the gearing; means to wind the spring and impart a limited reverse rotary movement to the pinion; means to connect the plunger at a predetermined time to said pinion when it is rotated by the spring through the gearing to impart movement to the plunger in one direction; and means to disconnect said plunger from the pinion at a predetermined time and permit return movement of the plunger.

12. In a device of the class specified the combination with a train of gearing and a spring to actuate the same, of a reciprocable plunger; a pinion rotatable in one direction by the spring through the gearing; means to wind the spring and impart a limited reverse rotary movement to the pinion in a direction reverse to that imparted thereto by the spring; a rotatably supported lever connected to the plunger; and means to connect said lever at a predetermined time to the pinion when the latter is rotated by the spring and impart movement to the plunger and at a predetermined time disconnect said lever from the pinion and permit return movement of the lever and plunger, substantially as and for the purpose specified.

13. In a device of the class specified the combination with a train of gearing, and a spring to actuate the same, of a reciprocable plunger; a pinion rotatable in one direction by the spring through the gearing; means to wind the spring and impart a limited rotary movement to the pinion in a direction reverse to that imparted thereto by the spring; a rotatably supported lever connected to the plunger; a latch pivotally carried by the lever; a pin projecting from the pinion coöperating with said latch to connect the lever to the pinion when the latter is rotated by the spring to impart movement to the plunger; and a trip to throw said latch out of operative connection with the pinion pin at a predetermined time to disconnect the lever from the pinion and permit return movement of the lever and plunger, substantially as and for the purpose specified.

14. The combination with a camera and its shutter actuating means, of an axially movable member to operate said shutter actuating means; a clock-work; a casing therefor having a laterally projecting tubular portion, and into which tubular portion the axially movable member is adapted to extend, said tubular portion having means to secure it to said member; a plunger slidably mounted in said tubular portion; and means to automatically connect said plunger to the clock-work at a predetermined time to impart movement thereto in one direction and thereby movement to the axially movable member and operate the shutter actuating mechanism.

15. The combination with a camera and its shutter actuating means, of an axially movable member to operate said shutter actuating means; a clock-work; a casing therefor having a laterally projecting tubular portion, and into which tubular portion the axially movable member is adapted to extend, said tubular portion having means to secure it to said member; a plunger slidably mounted in said tubular portion; means to automatically couple said plunger to the clock work at a predetermined time to impart movement to the plunger in one direction and thereby movement to the axially movable member; and means to disconnect the plunger from the clock-work at a predetermined time to permit return movement of the plunger and the axially movable member.

16. In a device of the class specified the combination with a train of gearing and a spring to actuate the same in one direction; a pinion rotated in one direction by the gearing when the latter is actuated by the spring; means to wind the spring and rotate said pinion a predetermined distance in a direction reverse to the movement imparted thereto by the spring; and means to limit said latter movement of the pinion, comprising a fixed stop and a stop rotatable with the winding means coöperating with the fixed stop.

17. In a device of the class specified the combination with a train of gearing and a spring to actuate the same in one direction; a pinion rotated in one direction by the gearing when the latter is actuated by the spring; means to wind the spring and rotate said pinion a predetermined distance in a direction reverse to the movement imparted thereto by the spring; and means to limit said latter movement of the pinion, comprising a fixed stop, a stop rotatable with the winding means, and an intermediate stop coöperating with the other two stops, substantially as and for the purpose specified.

18. In a device of the class specified, the combination with a train of gearing and a spring to actuate the same in one direction, of a pinion rotatable in one direction by the gearing when the latter is actuated by the spring; means to wind the spring and rotate said pinion a predetermined distance in a direction reverse to the movement imparted thereto by the spring; a graduated disk rotatable with the pinion to indicate the extent of said latter movement of the pinion; a reciprocable plunger; a latch connected to the plunger; a pin projecting from one face of the pinion to coöperate with the latch to couple the plunger to the gearing and impart movement thereto in one direction; an adjustable trip to engage with and trip the latch to disconnect the plunger from the gearing and permit return movement thereof; a pointer outside of the casing to adjust said trip; and graduations on the casing with which the pointer coöperates to indicate the extent of the adjustment of the trip, substantially as and for the purpose specified.

ALFRED G. F. KUROWSKI.
OTTO A. MARTINI.